Figure 1:
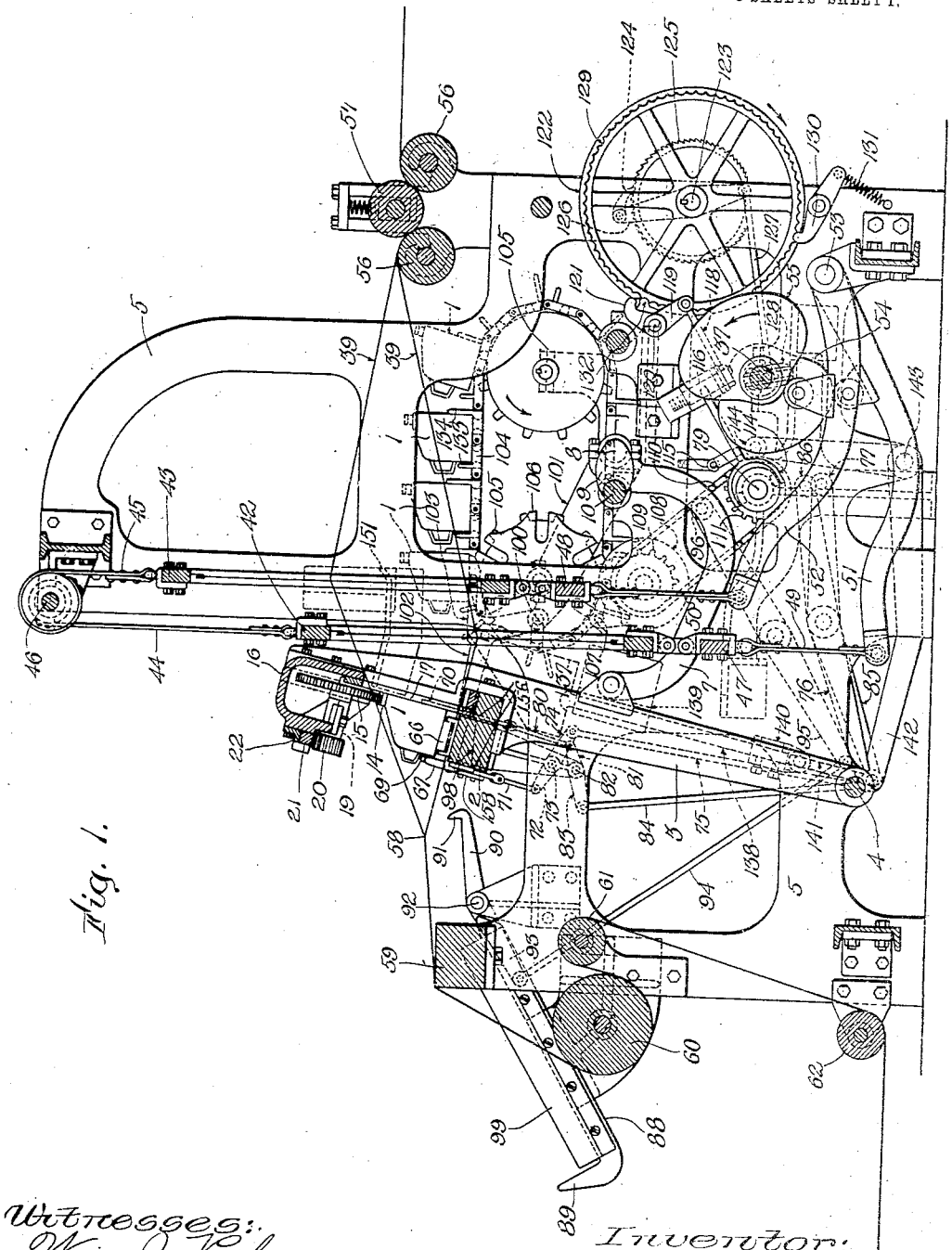

T. P. WALSH.
LOOM WITH AUTOMATIC POSITIVE SHUTTLE DRIVE AND SHUTTLE CHANGER FOR HEAVY WORK.
APPLICATION FILED JAN. 18, 1911.

1,122,448.

Patented Dec. 29, 1914.
8 SHEETS—SHEET 1.

Witnesses:
Wm. J. Pike
Edward Maxwell

Inventor:
Thomas P. Walsh,
by Geo. H. Maxwell
Attorney

T. P. WALSH.
LOOM WITH AUTOMATIC POSITIVE SHUTTLE DRIVE AND SHUTTLE CHANGER FOR HEAVY WORK.
APPLICATION FILED JAN. 18, 1911.
1,122,448.
Patented Dec. 29, 1914.
8 SHEETS—SHEET 2.
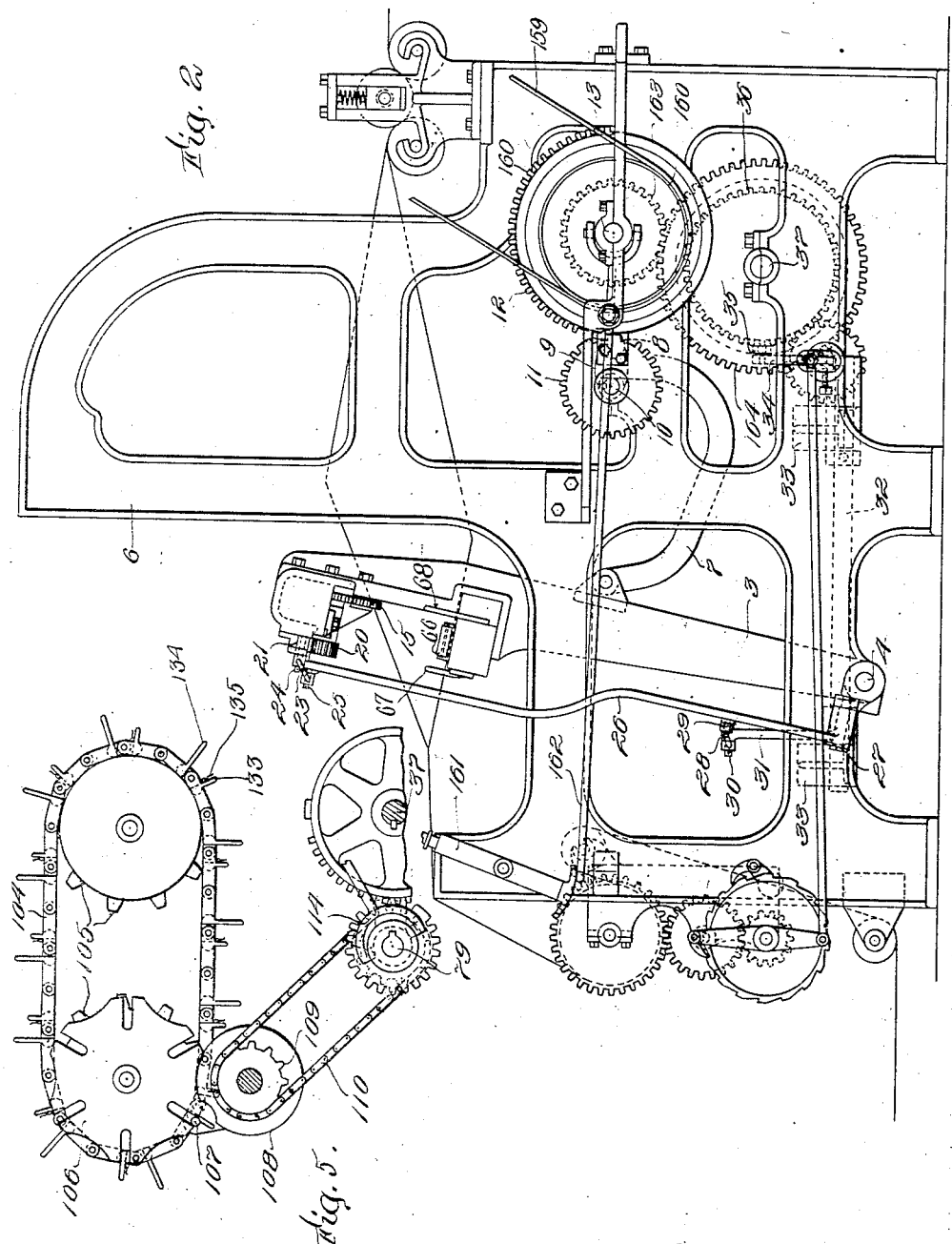
Witnesses:
Wm. J. Pike
Edward Maxwell
Inventor:
Thomas P. Walsh,
by Geo. W. Maxwell,
Attorney.

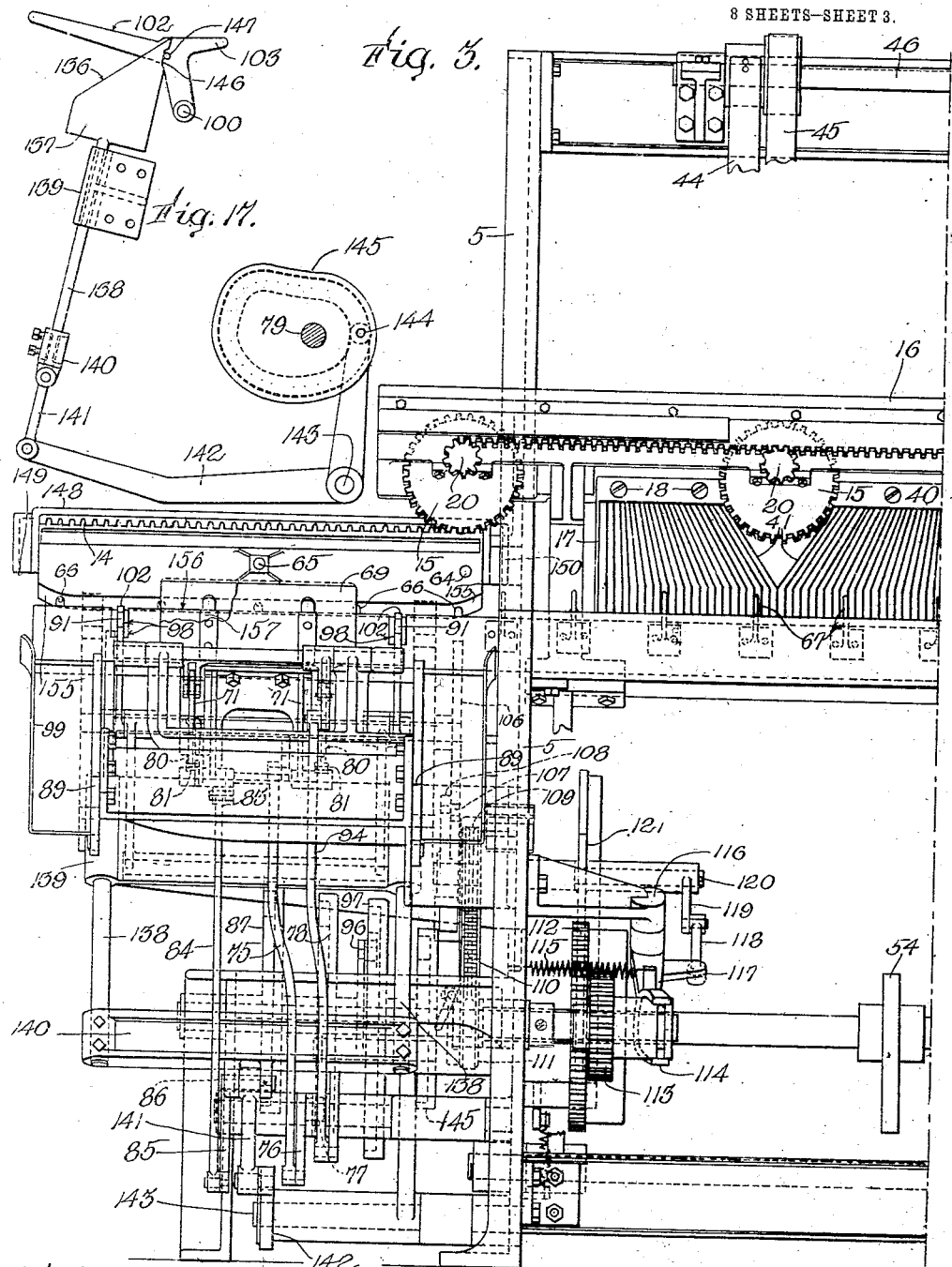

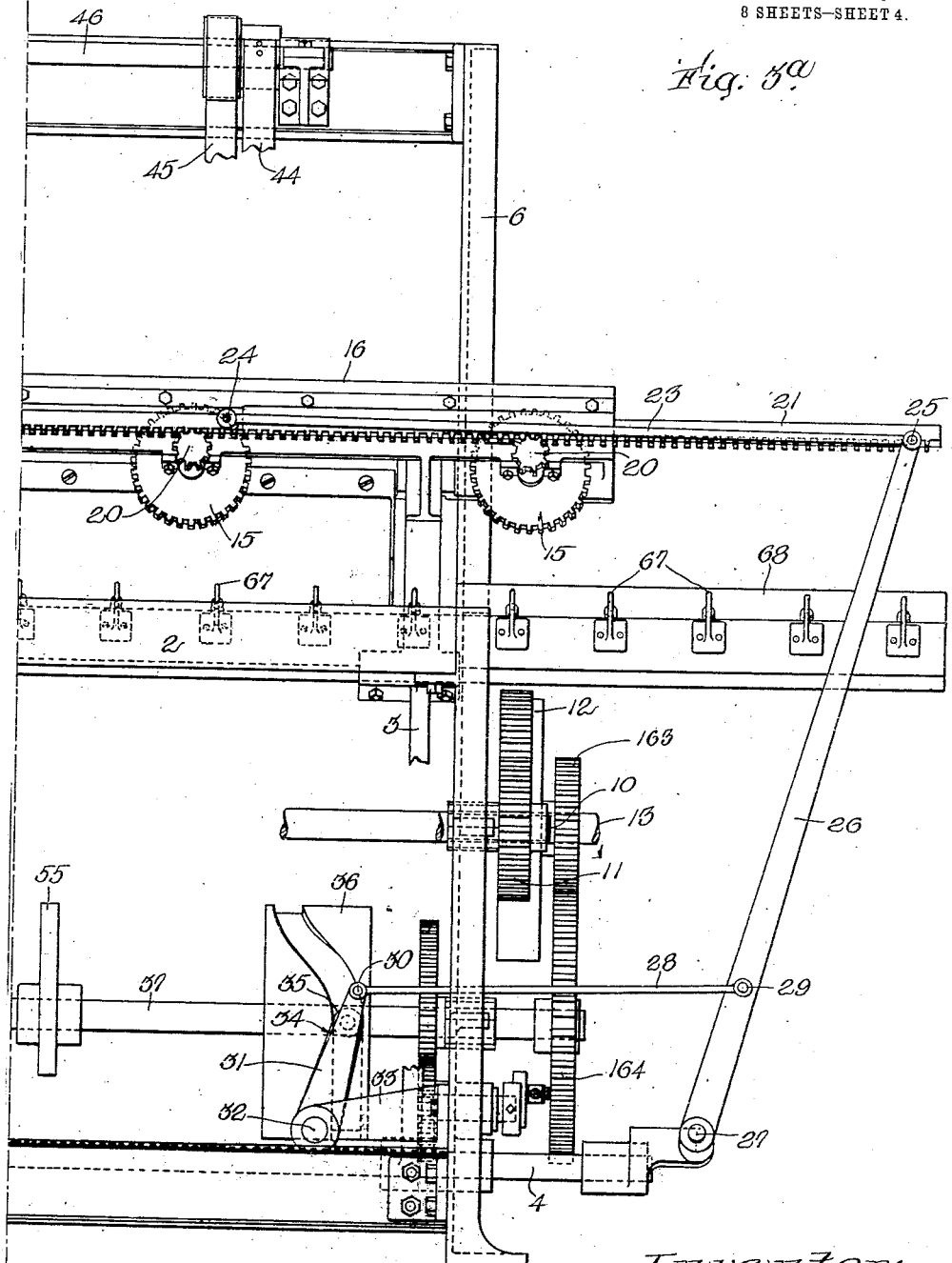

T. P. WALSH.
LOOM WITH AUTOMATIC POSITIVE SHUTTLE DRIVE AND SHUTTLE CHANGER FOR HEAVY WORK.
APPLICATION FILED JAN. 18, 1911.

1,122,448.

Patented Dec. 29, 1914.

8 SHEETS—SHEET 5.

Witnesses:
Wm J. Pike
Edward Maxwell

Inventor:
Thomas P. Walsh,
by Geo. H. Maxwell,
Attorney.

T. P. WALSH.
LOOM WITH AUTOMATIC POSITIVE SHUTTLE DRIVE AND SHUTTLE CHANGER FOR HEAVY WORK.
APPLICATION FILED JAN. 18, 1911.
1,122,448.
Patented Dec. 29, 1914.
8 SHEETS—SHEET 6.
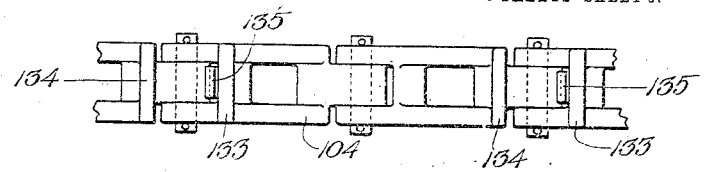
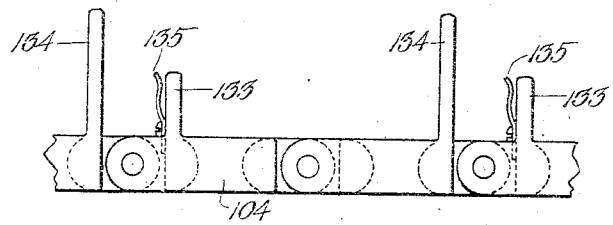
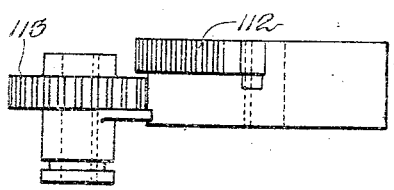
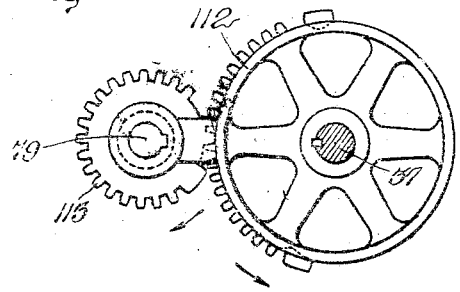
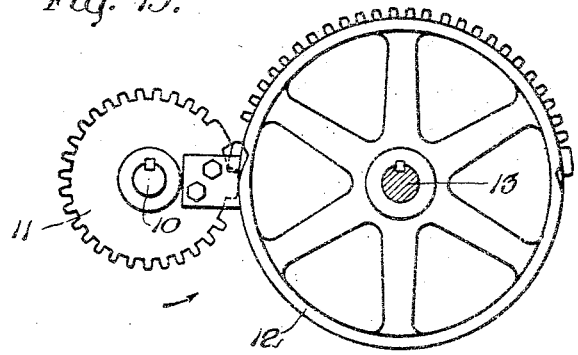
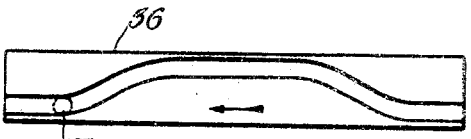

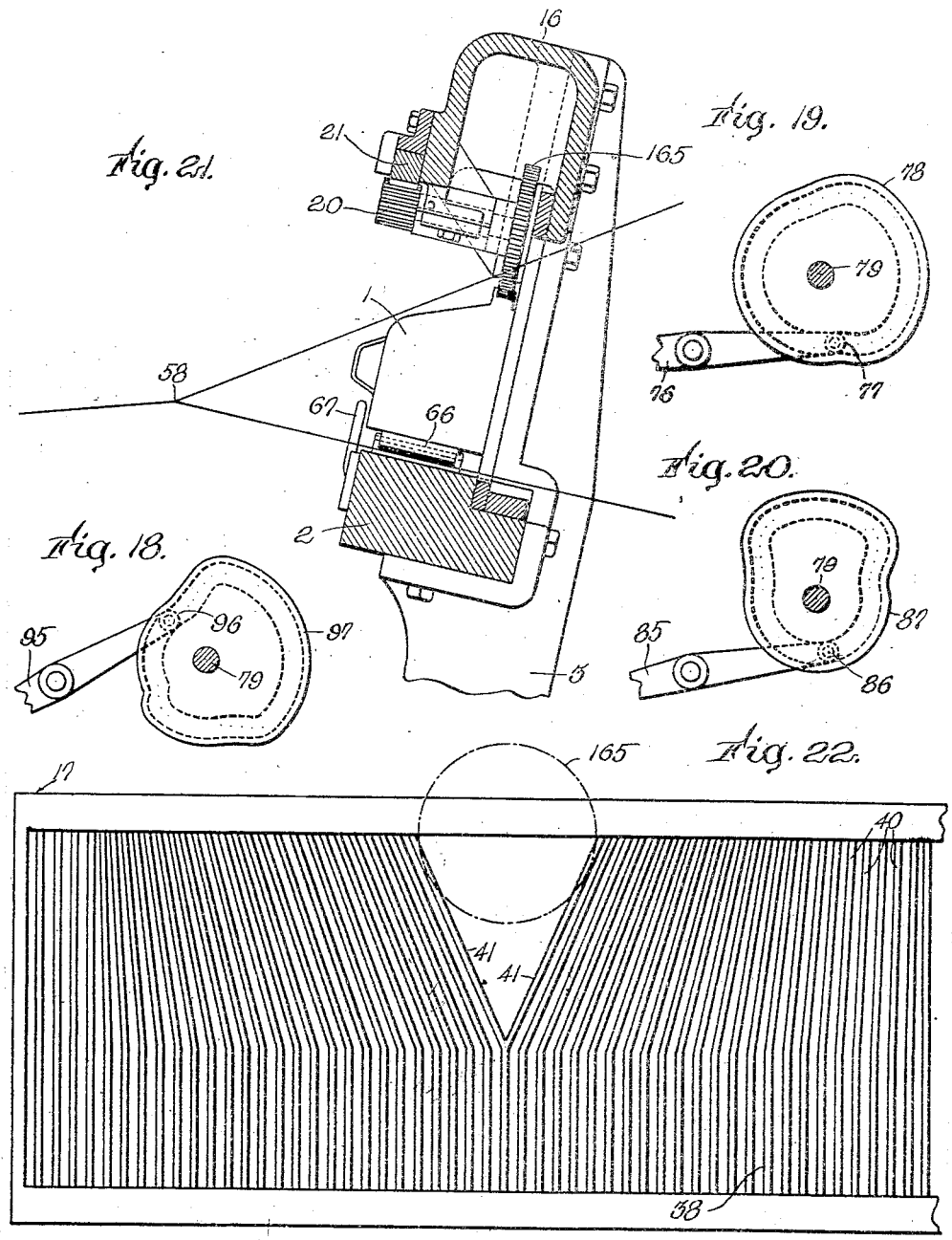

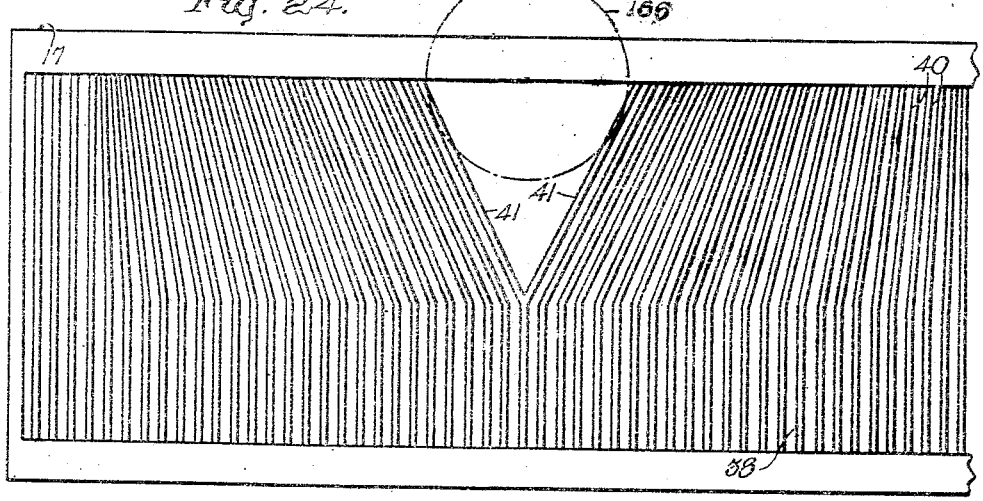
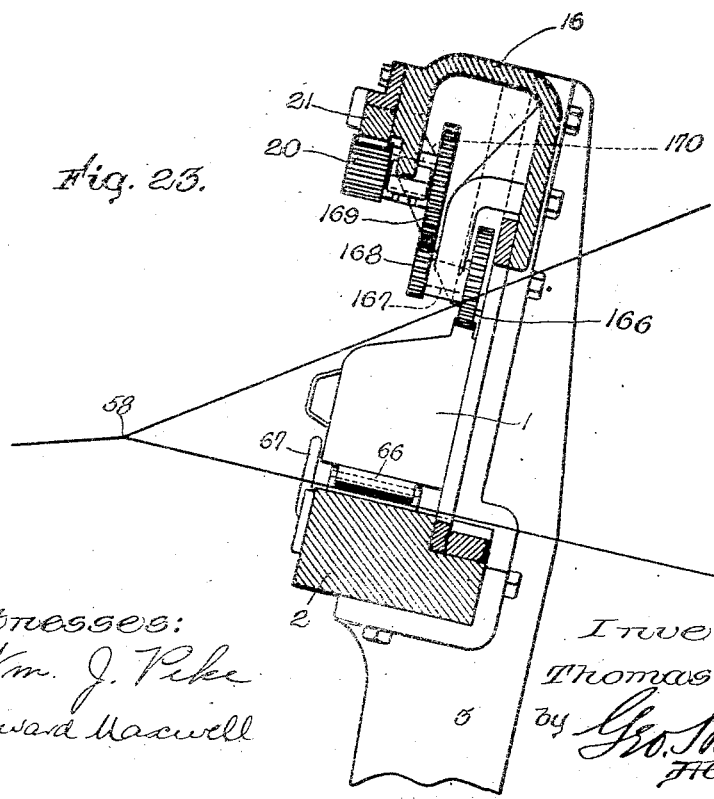

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

LOOM WITH AUTOMATIC POSITIVE SHUTTLE-DRIVE AND SHUTTLE-CHANGER FOR HEAVY WORK.

1,122,448.

Specification of Letters Patent.

Patented Dec. 29, 1914.

Application filed January 18, 1911. Serial No. 603,254.

*To all whom it may concern:*

Be it known that I, THOMAS P. WALSH, a citizen of the United States, and resident of Boston, in the county of Suffolk and State of Massachusetts, have invented an Improvement in Looms with Automatic Positive Shuttle-Drives and Shuttle-Changers for Heavy Work, of which the following description, in connection with the accompanying drawings, is a specification, like characters on the drawings representing like parts.

My present invention provides a positive drive for the shuttle capable of handling practically any character of filling, wire, cane, or otherwise, and weaving the same in practically unlimited widths and preferably with an uninterrupted weaving movement, in connection with an automatic shuttle changer adapted to such heavy work.

In the preferred embodiment of my invention, as herein shown, the shuttle is carried by the lay and has a positive rack and pinion drive. The shuttle is shorter than the width of the fabric, and, to permit this rack and pinion drive under such circumstances, I have devised a special reed or warp-deflecting mechanism for deflecting the warp threads which form one side of the shed, preferably the top thereof, so as to permit the coöperative engagement of the shuttle with its driving mechanism in the midst of the fabric.

In connection with the above mechanism, I provide automatic means for supplying the large shuttles with their heavy load of yarn, cord, rope, wire, or so forth, said supply mechanism and a coöperating discharge mechanism preferably operating at predetermined intervals, depending upon the character of the filling and hence the amount or length thereof which it is practicable for one shuttle to carry.

The constructional details of my invention will be pointed out more at length in the course of the following description, considered with reference to the accompanying drawings, which illustrate one of the preferred embodiments of the invention.

Figure 4:
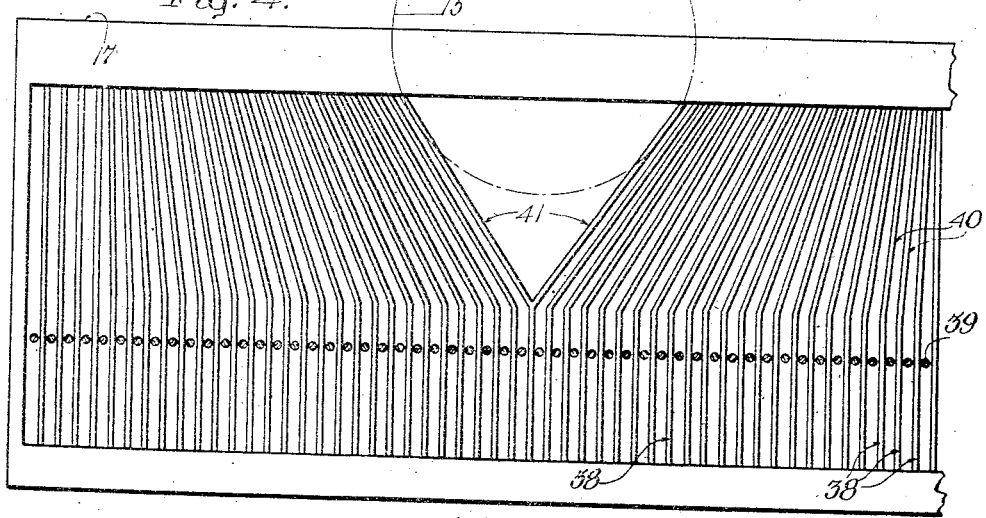
Figure 6:
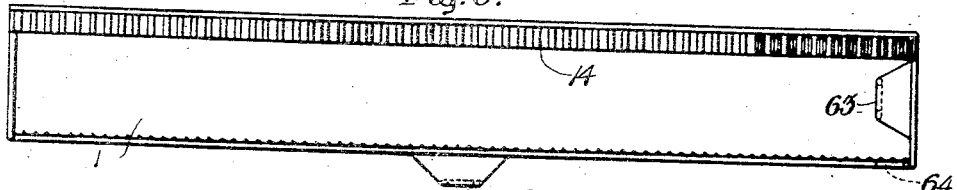
Figure 7:
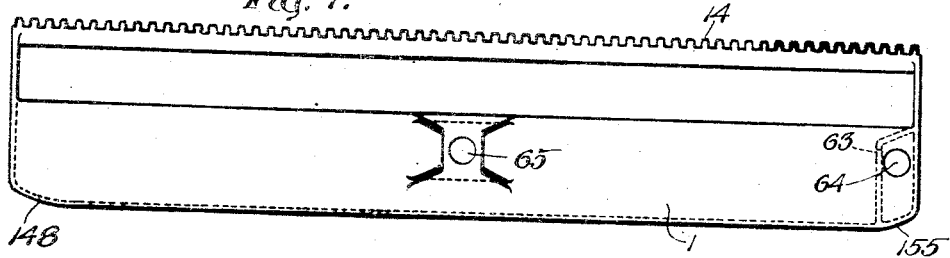
Figure 8:
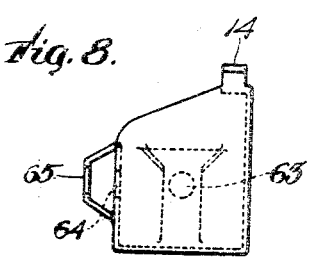
Figure 9:
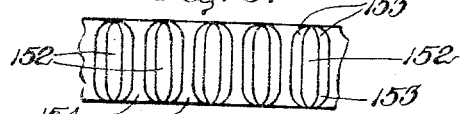
Figure 10:

In the drawings, Figure 1 is a central vertical longitudinal section of the loom; Fig. 2 is a right hand end view thereof; Figs. 3 and 3ª are views thereof in front elevation, parts being broken away and omitted; Fig. 4 is a front elevation of the reed; Fig. 5 is a sectional view showing in front elevation the shuttle changing mechanism; Figs. 6, 7, and 8 show the shuttle in top plan, front elevation, and end elevation respectively; Figs. 9 and 10 are enlarged fragmentary views in top plan and side elevation respectively showing the special kind of gear teeth employed on the shuttle rack and coöperating driving gear; Figs. 11 and 12 show in top plan and side elevation respectively a portion of one of the shuttle carrier chains; Figs. 13 and 14 show in top plan and side elevation respectively the gears for driving the shuttle changer; Fig. 15 is a view in side elevation of the gears for driving the lay crank shaft; Fig. 16 is a development of the shuttle-operating cam; Fig. 17 is a view in side elevation of the cam for placing the shuttle; Fig. 18 is a similar view of the cam for removing the shuttle; Figs. 19 and 20. are similar views respectively of the cams for operating the front and back shuttle retaining and guiding plates; Fig. 21 is a sectional view of a modified construction of shuttle drive; Fig. 22 is a view in front elevation of the reed for the mechanism of Fig. 21; and Figs. 23 and 24 are views similar to Figs. 21 and 22 of a further modification.

In the preferred construction of my present loom, as herein shown, the shuttle 1 is traversed or driven on the lay 2, which is supported and swung by usual lay swords 3 pivoted at 4 between the side frames 5, 6, said lay swords being shown as swung by lay connectors 7 pivoted at 8 on cranks or crank wrists 9 adjacent the end frames on a shaft 10 driven by mutilated gears 11, 12, the former on said shaft and the latter on the main drive shaft 13. As herein shown, each shuttle 1 is provided on its upper rear edge with an upstanding rack bar 14 extending the length of the shuttle in position to be engaged by gears 15 journaled in a cap or support 16 secured to the upper end of the lay swords above the reed 17, which is secured to said cap by screws 18. The gears 15 may be driven by any suitable power transmission mechanism, preferably carried by the cap support 16. As herein shown, on the front ends of the shafts 19 of the gears 15 are toothed pinions 20 meshing with the teeth of a reciprocating rack bar 21 mounted in a guideway 22 at the front overhanging portion of the top or support 16. This rack is operated by a link 23 pivoted thereto at 24, Fig. 3ª, and pivotally connected at 25 to a lever or arm 26 pivotally mounted at 27 on the right hand end of the pivoted shaft 4 of the lay swords. A link 28 is pivotally connected at 29 to said arm 26 and at 30 to a crank or arm 31 extending upward from a rock shaft 32 journaled at its opposite ends in bearings or brackets 33 extending inwardly from the lower end of the end frame 6, said rock shaft 32 being provided at its rear end with a cam lever 34 whose roll 35 is actuated by a path cam 36 fast on the cam shaft 37. The gears 15 are spaced apart across the loom at intervals commensurate with the length of the shuttle, the loom herein shown having four of such gears, two at the ends just outside of the width of the fabric and two in the midst of the fabric. In order to permit these intermediate gears to be thus located and to engage the rack 14 of the shuttle, provision is made for separating or deflecting the top warp threads of the shed so as to provide a gap to be occupied by the adjacent gear 15. Preferably this separating or deflecting of one of the horizontal walls of the shed is accomplished by means of the reed (or whatever means is provided for beating up), although it will be understood that the separating function and the beating-up function are entirely distinct and the mechanisms are therefore to be considered distinct.

As best shown in Fig. 4, it will be seen that the lower part of the reed has the dents or wires 38 vertical and parallel to a sufficient height for beating up the warp threads 39 when leveled, but that said reeds are out of parallel and bent obliquely away from the middle of the section, as indicated at 40, the innermost reed 41 being herein shown as Y-shaped and open at its upper end a sufficient distance to compel the warp threads to be sufficiently deflected so as not to interfere with the gear 15, or in other words, this arrangement of the dents or wires of the reed compels the normally parallel warp threads to be deflected out of parallel on the shedding movement and open a gap in the top of the shed at the point occupied by a gear 15, there being as many sections of reed similar to that shown in Fig. 4 as there are gears 15 in the midst of the fabric. Thus gaps are formed by deflecting the warp threads in the wall of the shed which is adjacent the shuttle operating gears whenever the shuttle is to pass through, but the warp threads are all maintained straight and parallel in usual manner during the beating up step of the weaving, and this alternate straightening and deflecting of the warp threads takes place for every cycle of weaving operations and is accomplished automatically by the coöperation of the reed and harness. As a matter of convenience, I prefer to make the inclined gap forming deflectors 40, 41 continuous with and as an integral part of the beating up comb or reed, inasmuch as this gives a smooth runway for the warp threads in passing from their leveled position for beating-up to their shed position, although it will be understood, as already stated, that the gap forming mechanism or warp-thread deflecting mechanism, is not to be confused with the reed proper, and that a separate or independent mechanism for this purpose is within the spirit and scope of my invention. As herein shown, I have provided simply an ordinary two-harness shedding mechanism, similar harnesses 42, 43 being herein shown supported by straps 44, 45 passing in opposite directions around a shaft 46 at the top of the loom, said harnesses being connected respectively by lam shafts 47, 48 linked to their lower ends, and straps 49, 50 connecting to usual treadle levers 51, 52 pivoted at 53 to a fixed support and actuated by cams 54, 55 on the cam shaft 37. The warp threads pass through the harnesses in usual manner from let-off rolls or tension rolls 56, 57 to the fell at 58 and thence over a breast beam 59 to a take up roll 60, and guide rolls 61, 62 to any kind of a winding mechanism, not shown.

The gear shuttle is shown in Figs. 6-8, where it will be seen that it consists of a large rectangular box-like receptacle for the cop, the leading end of whose thread passes through an eye 63 in the inner end of the shuttle and thence through an eye 64 in the front wall to and through an eye 65 at about the middle of the shuttle. In view of the size and weight of this shuttle when loaded with its complement of yarn, wire, or other heavy material, the lay 2 is provided with transverse roller bearings 66 to raise the shuttle above the warp threads at the bottom of the shed so as to prevent the shuttle from catching against any of said warp threads or injuring said threads, and also so as to give the shuttle free easy movement as it is traversed by the rack and pinion driving mechanism. The reed acts as a guide for the rear side of the shuttle, and at the front side of the lay I provide a series of short guides or guards 67 for preventing the shuttle from moving forward from its proper course. As herein shown, the lay extends beyond the end frames of the loom, the right hand end thereof being provided at its rear side with a stationary guide plate 68 and the left hand end thereof with a front guide plate 69 and a rear guide plate 70. These two plates 69, 70 are vertically movable in connection with the shuttle changing mechanism, as best shown in Fig. 1. The front guide plate 69 is connected by links 71 to crank arms 72 extending forwardly from a rock shaft 73 provided with a rearward arm or lever 74 which connects by a rod 75 to an intermediately pivoted arm 76 actuated at its rear end 77 by a cam 78 fast on shaft 79. The rear plate 70 is similarly connected by links 80 to crank arms 81 on a shaft 82 provided with a lever 83 connected by a rod 84 with an intermediately pivoted lever 85 whose roll 86 is actuated by a cam 87.

At a suitable place with reference to the operating shuttle, preferably at the left side of the loom outside of the end frame 5, is a shuttle remover and chute, the latter being herein shown in the form of an inclined shelf or platform 88 having a stop 89 at its lower end, and the former being shown as two rearwardly extending arms 90 provided with hooks 91 and pivoted at 92. A lever or rocker arm 93 extends forward to an actuating rod 94 for actuating said arms 90, said rod being operated by an intermediately pivoted lever 95 whose cam roll 96 is actuated by a cam 97 on the shaft 79. The lay 2 is provided in its upper side, at either end of the plates 69, 70, and in alinement with the hooked arms 90, with transverse slots or openings 98 for receiving the hooked arms 90 at each forward beat of the lay, said arms, however, accomplishing nothing when in the position shown in Fig. 1, but only when moved from that position by the cam 97 for discharging a spent shuttle. When therefore a shuttle has been exhausted, the front plate 69 is moved down out of holding position with relation to the shuttle by its cam 78, and, the lay then being in its forward position, the cam 97 causes the hooked arms 90 to be lifted slightly so that their hooks 91 engage behind the spent shuttle 1, discharging the latter, which slides down the chute 88, on which it is retained by an end flange 99. The timing of these cams is such that, when a shuttle has been shot across the loom the predetermined number of times suited to its capacity with the kind of filling being woven, the shuttle will be discharged. The spent shuttle having been discharged, a new shuttle and supply of filling is inserted on the backward movement of the lay, so that when the lay has come to a halt, the new shuttle is already in place ready to be shot forward without any interference with the continuous weaving operation. For this purpose, the rear guide plate 70 is moved down by its cam 87 as the lay is swinging back, and at the same time the front plate 69 is moved up.

Pivoted at 100 on a projecting end of a stationary supporting bracket 101 is a pair of supports 102 projecting forward in the form of relatively narrow thin fingers to enter the slots 98 on each backward swing of the lay, and projecting rearwardly at 103 to receive the forward new or fresh shuttle from the feed chains or shuttle carrier 104 as said carrier is moved along at the proper time by its actuators. The shuttle carrier 104 for supplying new shuttles as needed is herein shown as mounted on sprocket wheels 105 at its opposite ends actuated by a Geneva movement, the star wheel 106 of which is engaged by a pin 107 of a pin wheel 108 on the hub of a sprocket wheel 109 driven by a chain 110 and sprocket wheel 111 fast on the shaft 79 driven intermittingly by any suitable mechanism. As herein shown, a mutilated driving gear 112 is fast on the cam shaft 37, see Figs. 13, 14, and drives a gear 113 splined for longitudinal movement on the shaft 79 and moved into and out of driven position at proper times by a fork 114 acting in opposition to a spring 115, said fork being pivotally mounted at 116 on a bracket inside of the end frame 5, Fig. 3, and actuated by a lever 117, link 118, crank 119, sleeved on a stud 120 on said end frame, controlled by a dog 121, Fig. 1, riding on the periphery of a cam 122 fast on a stub shaft 123. The shaft 123 is driven by a dog 124 engaging a ratchet 125 on said shaft, said dog being actuated by a rock bar 126, rod 127, and cup crank 128 fast on a shaft 37. At one side of the cam wheel 122 is a locking plate or dwell wheel 129 against which a dog 130 is held by a spring 131. In the periphery of the cam 122 is a cam depression 132 which permits the dog 121 to be actuated by the spring 115, thereby throwing the gear 113 to the left, Figs. 3 and 13, which starts the shaft 79 so as to throw out the spent shuttle and put in a new one. The shuttle carrier 104 is spaced apart the width of the shuttles by front guides or holders 133 and rear holders 134, Figs. 1, 11, 12, which extend up rigidly from the links of the carrier chain in position to hold a shuttle between them. The uprights 134 also serve as pushers for delivering the shuttle.

Preferably the holders 133 on the inner chain next to the end frame 5 are provided with spring clips 135 to receive and bind the free end of the filling yarn of the shuttle so as to hold the same back as the shuttle moves forward on its first shot, being sufficiently yielding, however, to permit it to pull out thereafter. I prefer the link or chain construction of carrier described, as it permits the shuttles on the horizontal or intermediate portion of their travel to be held firmly, as will be evident viewing Fig. 1, but opens out to permit them to be readily dropped into place easily at the start, and likewise opens out adjacent the end of their travel to permit them to be readily delivered to the supporting arms 103. As herein shown, the shaft 37 rotates once only for two picks or shots of filling, so that the ratchet 125 is advanced one tooth for each complete to and fro movement of the shuttle, so that the shuttle is necessarily always on the changing end of the lay (as herein shown, and preferably, at the left hand end of the loom).

After the spent shuttle has been removed by the hooked arms 90 on the forward swing of the lay, as already described, the arms 102 enter the slots 98 as the lay swings back, the plate 70 having meanwhile been drawn down out of the way, as previously described, and a new shuttle has been advanced from the chain onto the arms 103 and then shoved along by the pusher uprights 134, which continue to engage said shuttle until its rear side has been pushed to the position indicated by the free end of the upper oblique pusher 134, Fig. 1, whereupon the shuttle is engaged by the front inclined edges 136 of shuttle placers or positioning plates 137 raised at this moment by bars 138 mounted to slide in a stationary bracket 139. The lower ends of these bars 138 are held fast in a transverse bar 140 actuated by a link 141 and bell crank lever 142 pivoted at 143 on the frame, whose cam roll 144 is actuated by a cam 145 on the shaft 79. As the placer plates 137 rise to shove the fresh shuttle into accurately placed position on the lay, it is necessary that said shuttle should be slightly lifted in order that it may properly ride up onto the rolls 66, and accordingly I provide a cam surface 146 on the upper rear edge of each plate 137 to engage a stud or roll 147 on the adjacent arm 102, whereby, as said shuttle placer rises, its cam surface 146 operates against the adjacent stud or roll 147, to swing the arm 102 on its pivot 100 so that said arm is lifted just enough to permit the lay 2 and its rolls 66 to ride back under the shuttle as the shuttle is being pushed forward to meet it.

To position the shuttle accurately endwise (rendered advisable because of the rack and pinion drive for the shuttle), I provide an overhanging endwise director or guide 148 whose ends flare outwardly toward the rear or are bell shaped as indicated at 149, 150, Fig. 3, the rear upper edge thereof preferably also flaring as indicated at 151, Fig. 1. This bell shaped or flaring housing or endwise positioner, compels the shuttle to aline itself with the utmost accuracy endwise and also prevents any tendency whatever to be tipped or rolled by the placer plates 137. Still further to insure certainty of proper engagement between the racks 14 and their driving pinions 15, I bevel or round off the ends of their teeth 152, as shown at 153, Figs. 9 and 10, thereby providing a flaring or bell shaped space 154 between each pair of teeth of one member to receive the wedge shaped or sloping and pointed ends of the teeth of the other member, as the shuttle is slid sidewise into position on the lay, thereby bringing its rack 14 into interlocked relation with the end gear 15. This peculiar form of teeth and intervening spaces is only necessary for those portions of the end gear and the front end of the shuttle rack which are subjected to said sidewise engagement when a new shuttle is put in place. The result is that as the lay comes into its rear position, the shuttle has arrived in operative position thereon and the rear plate or gate 70 is then raised into position to coöperate with the front plate 69 to guide the shuttle accurately as it is moved forward by its rack and pinion moving mechanism. As soon as the placers 137 have performed their positioning office, they drop back out of the way of the next shuttle. The rolls 66 are preferably arranged at sufficiently short distances to bring enough of them under a shuttle at one time to prevent any possible unevenness of travel of the latter and the shuttle is slightly upturned at the ends of its bottom as indicated at 155 for still further facilitating the smooth running thereof on the rolls.

To insure that the spacing of the front and back guide plates 69, 70 shall remain always the same, I preferably secure to the wood of the lay front and back metal plates 156 to receive the wear of the up and down movement of the plates 69, 70, which are slotted to ride on lugs or vertical guide strips 157 secured to and projecting from said plates 156. Cap plates 158 are bolted over said slots to said strips 157, thereby forming with the latter T-guides for the slotted plates 69, 70. The loom is driven by a belt 159, Fig. 2, and pulley 160 on the shaft 13 (the starting and stopping being under the usual control of a shipper handle 161 and lever 162) and gears 163, 164.

In handling certain kinds of warp material, it is advisable to have the gap or warp deflection less than in Fig. 4, which is better adapted to relatively loose or coarsely woven fabric. In Fig. 22, I have shown a reed affording a smaller gap, and in Fig. 24 one showing a still smaller gap. In the former instance, the rack and pinion mechanism is substantially the same as already described, excepting that the driving pinion is smaller, as shown at 165, Figs. 21, 22. In the latter instance, I have shown a still smaller gear 166, Figs. 23, 24, whose shaft 167 carries a pinion 168 at its forward end meshing with a gear 169 on a shaft 170, to whose outer end is secured the pinion 20, already described, driven by the rack 21 mounted in the cap support 16.

While I prefer the form of shuttle shown in Figs. 6-8, it will be understood that the shuttle used in practice conforms to the filling material being woven, and while the shuttle 1 is adapted to a wide range of filling materials, it is not adapted to all the heavy work which my loom provides for.

It will be understood from the foregoing description that my invention provides positively driven means for traversing the shuttle with a uniform speed irrespective of whether the filling material is light or heavy, readily flexible or stiff, small or large, even or bunchy, smooth or rough and kinky, weak or strong. Also, notwithstanding this strong positive driving mechanism, preferably carried by and operating in connection with the lay, the construction is such that it is entirely practicable to operate the loom at a relatively high speed as compared with previous looms for such work, and the shuttle changing mechanism furthermore accomplishes the discharge of the spent shuttle and placing of the fresh shuttle without requiring the stopping or slowing down of the loom.

By positively actuated or positively driven, I mean to distinguish from a shuttle which is simply shot across the loom by an initial impulse and then left to take care of itself by its own momentum. This is the movement and operation given to what is known as a fly shuttle, which is impelled by a sudden severe blow from a picker stick, the result being that the yarn is brought under extreme snapping strain at the beginning of the movement, which movement is extremely rapid at the start and diminishes as the shuttle proceeds across the loom. My shuttle drive is distinguished from this, by having a continuous and uniform driving impulse imparted thereto throughout the entire traverse, by the direct and continuous engagement with the shuttle of driving or moving means throughout the entire travel of the shuttle from one edge of the fabric to the other. This eliminates all sudden strain upon the filling, and makes it possible to weave at relatively high speed such irregular, bunchy, kinky, stiff material as is frequently used in weaving jute bagging, for instance. When, therefore, I refer in the claims to positively actuated or positively driven shuttle, I mean to restrict the same to the operation and mechanism as thus defined.

Having described my invention, what I claim as new and desire to secure by Letters Patent is:

1. In a loom, means for supporting a shuttle in operative position, shedding mechanism, means including the reed for spreading apart the warp threads of one side of the shed to form a gap therein, positive shuttle-driving mechanism having a part operating through said gap on the shuttle, and alining means for guiding the shuttle into accurate position to coöperate on said supporting means with said positive shuttle driving mechanism.

2. In a loom, means for supporting a shuttle in operative position, shedding mechanism, means for spreading apart the warp threads of one side of the shed at a plurality of places in the length thereof, positive shuttle driving mechanism having means operating on the shuttle at said plurality of places for moving the shuttle through the shed from one side of the loom to the other, and alining means for guiding the shuttle into accurate engagement with said positive driving mechanism.

3. In a loom, means for supporting a shuttle in operative position, a reed having means for maintaining the warp threads parallel when leveled for the beating-up movement and provided with means for thereafter deflecting certain of the warp threads out of parallelism to form a V-shaped gap between certain of the warp threads, positive shuttle driving means located at one side of the plane of the deflected warp threads and extending through said gap to operate on the other side of said plane, and alining means for guiding said shuttle endwise into accurate position on said supporting means to coöperate with said positive shuttle driving means.

4. In a loom, means for supporting a shuttle in operative position, shedding mechanism, beating-up mechanism, a reed carrying means for spreading apart certain of the warp threads after each beating-up movement, positive shuttle-driving mechanism having a part operating through the gap thus formed in the warp threads on the shuttle, and alining means for automatically adjusting the shuttle into accurate coöperation with said positive shuttle driving mechanism.

5. In a loom, means for supporting a shuttle in operative position, shedding mechanism, beating-up mechanism, means dependent upon the shedding movement for spreading apart certain of the warp threads after each beating-up movement and for restoring said spread-apart warp threads to their original normal position for each beating-up movement, positive shuttle driving mechanism for operating on the shuttle through the spread-apart places in the warp threads, and alining means for accurately positioning the shuttle to engage said positive driving mechanism.

6. In a loom, means for supporting a shuttle in operative position, means for supporting the warp threads, a reed containing means for spreading apart a portion of said warp threads to form a gap therein, a shuttle to travel on one side of said portion of the warp threads, positive driving means for said shuttle mounted on the other side of said portion of the warp threads and having an operating part extending through said gap for driving the shuttle, and alining means for accurately positioning the shuttle to engage said positive driving means.

7. In a loom, means for supporting a shuttle in operative position, means for supporting the warp threads, a reed containing means for spreading apart a portion of said warp threads to form a gap therein, a shuttle to travel on one side of said portion of the warp threads, positive driving means mounted on the other side of said portion of the warp threads and having an operating part extending through said gap for moving said shuttle, said shuttle and said operating part having mutually engaging portions coöperative when the shuttle reaches said gap to move said shuttle beyond the gap, and alining means for guiding the shuttle into initial engagement with said positive driving means.

8. In a loom, means for supporting a shuttle in operative position, shedding mechanism, a combined reed and warp-thread-spreading device having deflecting means extending continuously from and coincident with the reed dents, forming a gap intermediate the ends of the reed, shuttle driving mechanism operating through said gap on the shuttle, and alining means for accurately positioning the shuttle to engage said shuttle driving mechanism.

9. In a loom, means for supporting a shuttle in operative position, a reed mechanism containing a series of dent-like members extending parallel to each other for a portion of the width of said mechanism and extending obliquely out of parallelism to each other a remaining portion of the width of said device to form a gap, positive shuttle driving mechanism having a part extending in said gap to engage the shuttle, and alining means for accurately positioning the shuttle to coöperate with said positive driving mechanism.

10. In a loom, means for supporting a shuttle in operative position, reed mechanism having at one side thereof a series of parallel dent-like members coextensive at least with the beating-up region thereof, said members extending thence obliquely to form a V-shaped gap intermediate the ends of the reed mechanism, positive shuttle driving mechanism having a part occupying said gap to operate on the shuttle, and alining means for accurately positioning the shuttle to coöperate with said positive driving mechanism.

11. In a loom, means for supporting a shuttle in operative position, shedding mechanism, means for normally maintaining the warp threads parallel at the weaving point of the loom during the beating-up movement, means for progressively deflecting said warp threads while maintaining them mutually separated and for thereby providing wide open gaps between certain of the warp threads at times, a shuttle to travel transversely of said warp threads across the loom at one side of the warp threads, positive shuttle driving mechanism located on the other side of said warp threads for moving the shuttle, provided with means adapted to operate on said shuttle through said gaps when the latter are formed, and alining means for accurately positioning the shuttle to coöperate with said positive driving mechanism.

12. In a loom, means for supporting a shuttle in operative position, means for supporting the warp threads, a shuttle provided with a rack bar, positive driving means for said shuttle, including vertically immovable supporting means provided with a plurality of toothed pinions at intervals across the loom in operative position to engage successively the rack of said shuttle, shedding mechanism, means dependent upon the shedding movement for spreading apart the warp threads at intervals to form gaps in one side of the shed, certain of said pinions being located to operate in said gaps on the shuttle in the midst of the width of the fabric for moving the shuttle positively in the weaving operation, and alining means for guiding the shuttle into accurate position to coöperate with said positive driving means.

13. In a loom, means for supporting a shuttle in operative position, means for supporting the warp threads, a shuttle shorter than the width of the fabric, and provided with a rack bar, positive shuttle driving means, including a plurality of toothed pinions at intervals across the loom in vertically fixed operative position to engage successively the rack of said shuttle, certain of said pinions being located to operate on the shuttle in the midst of the width of the fabric and others of the pinions being located at the sides of the loom to operate on the said shuttle outside of the fabric, and alining means for accurately positioning the shuttle to coöperate with said positive driving means.

14. In a loom, means for supporting a shuttle in operative position, a lay, a shuttle shorter in length than the width of the fabric being woven, positive shuttle driving means carried by said lay for positively moving the shuttle at a substantially uniform speed across the loom, and alining means for accurately positioning the shuttle to coöperate with said positive driving means.

15. In a loom, means for supporting a shuttle in operative position, a lay, a shuttle shorter in length than the width of the fabric being woven, positive shuttle driving means carried by said lay for positively moving the shuttle at a substantially uniform speed across the loom, including a rack on the shuttle and a series of pinions on the lay, certain of which pinions are positioned to operate on the shuttle in the midst of the fabric, and alining means for accurately positioning the shuttle to coöperate with said positive driving means.

16. In a loom, means for supporting a shuttle in operative position, a lay, a shuttle shorter in length than the width of the fabric being woven, positive shuttle driving means carried by said lay for positively moving the shuttle at a substantially uniform speed across the loom, including a rack on the shuttle and a series of pinions on the lay, certain of which pinions are positioned to operate on the shuttle in the midst of the fabric, means for spreading the warp threads apart at said pinions to permit the pinions to engage said rack, and alining means for accurately positioning the shuttle to coöperate with said positive driving means.

17. In a loom, shedding mechanism, a shuttle, mechanism for driving said shuttle through the shed, pulling means for engaging and removing the shuttle at the front of the loom, and means for tipping said pulling means for discharging the shuttle toward the front of the loom by gravity.

18. In a loom, shedding mechanism, a shuttle, mechanism for driving said shuttle through the shed, and a pulling hook for discharging the shuttle, the hooked end being in position to engage behind the shuttle, and operating means to operate said hooked pulling means when the shuttle is to be discharged.

19. In a loom, a lay, having a transverse slot in its upper side, a shuttle having a position of rest above said slot, a removing device mounted adjacent the front of the loom to enter said slot upon the forward beat of the lay, and automatic operating mechanism for actuating said removing device to retain said shuttle in its forward position when the lay swings back.

20. In a loom, a lay, having a transverse slot in its upper side, a shuttle having a position of rest above said slot, a removing device mounted adjacent the front of the loom to enter said slot upon the forward beat of the lay, and automatic operating mechanism having predetermined periods of operation for actuating said removing device to retain said shuttle in its forward position when the lay swings back.

21. In a loom, means for supporting a shuttle in operative position, shuttle supplying mechanism for supplying a new shuttle when a previous shuttle has been spent, a lay for receiving said shuttle from said supporting means, means carried by said lay for positively moving the shuttle on the lay transversely of the loom, and alining means for guiding said new shuttle endwise into accurate position on said supporting means to coöperate with said positive shuttle motion means on the lay.

22. In a loom, means for supporting a shuttle in operative position, shuttle supplying mechanism for supplying a new shuttle when a previous shuttle has been spent, a lay for receiving said shuttle from said supporting means, means carried by said lay for positively moving the shuttle on the lay transversely of the loom, alining means for guiding said new shuttle endwise into accurate position on said supporting means to coöperate with said positive shuttle motion means on the lay, and means extending upwardly at the opposite sides of the lay for guiding the shuttle at both of its longitudinal sides accurately with relation to said positive shuttle motion means.

23. In a loom, means for supporting a shuttle in operative position, shuttle supplying mechanism for supplying a new shuttle when a previous shuttle has been spent, a lay for receiving said shuttle from said supporting means, means carried by said lay for positively moving the shuttle on the lay transversely of the loom, alining means for guiding said new shuttle endwise into accurate position on said supporting means to coöperate with said positive shuttle motion means on the lay, means extending upwardly at the opposite sides of the lay for guiding the shuttle at both of its longitudinal sides accurately with relation to said positive shuttle motion means, and means above the lay for holding the shuttle in unremitting engagement with the lay as it travels lengthwise thereof.

24. In a loom, a lay, a shuttle shorter in length than the width of the fabric being woven, means carried by said lay for positively moving the shuttle at a substantially uniform speed across the loom, including a rack on the shuttle and a series of pinions on the lay, certain of which pinions are positioned to operate on the shuttle in the midst of the fabric, means for supporting a shuttle in operative position at one side of the loom, shuttle supplying mechanism for supplying a new shuttle when a previous shuttle has been spent, and alining means for guiding said new shuttle onto said supporting means in accurate position to bring the teeth of the shuttle rack into accurate alinement and engagement with the adjacent pinion on said lay.

25. In a loom, a lay, a shuttle shorter in length than the width of the fabric being woven, means carried by said lay for positively moving the shuttle at a substantially uniform speed across the loom, including a rack on the shuttle and a series of pinions on the lay, certain of which pinions are positioned to operate on the shuttle in the midst of the fabric, means for supporting a shuttle in operative position at one side of the loom, shuttle supplying mechanism for supplying a new shuttle when a previous shuttle has been spent, alining means for guiding said new shuttle onto said supporting means in accurate position to bring the teeth of the shuttle rack into accurate alinement and engagement with the adjacent pinion on said lay, and means for spreading apart the warp threads at the side of the shed adjacent said pinions to permit the pinions to engage the rack of the shaft.

26. In a loom, a lay, a shuttle shorter in length than the width of the fabric being woven, means carried by said lay for positively moving the shuttle at a substantially uniform speed across the loom, including a rack on the shuttle and a series of pinions on the lay, certain of which pinions are positioned to operate on the shuttle in the midst of the fabric, shedding mechanism, means mounted on said lay coincident with the dents of the reed for laterally deflecting certain of the warp threads in response to the shedding movement for forming gaps in the adjacent side of the shed to receive said last mentioned pinions in position to operate on the shuttle and thereby pass the shuttle through the shed, means for supporting a shuttle in operative position at one side of the loom, shuttle supplying mechanism for supplying a new shuttle when a previous shuttle has been spent, and alining means for guiding said new shuttle onto said supporting means in accurate position to bring the teeth of the shuttle rack into accurate alinement and engagement with the adjacent pinion on said lay.

27. In a loom, supporting means for supporting a shuttle in position to be delivered across the loom, shuttle placer for accurately placing a shuttle on said supporting means, and a shuttle lifter for raising said shuttle as it is being moved forward by said placer.

28. In a loom, supporting means for supporting a shuttle in position to be delivered across the loom, a shuttle placer for accurately placing a shuttle on said supporting means, and a shuttle lifter provided with operating means actuated by said placer for lifting the shuttle as it is moved into place by the placer.

29. In a loom, a lay, means for supporting the warp threads in position to engage the top of said lay, a shuttle to travel on said lay, means carried by said lay to raise said shuttle slightly above said warp threads as the shuttle travels on the lay, and shuttle delivering mechanism for delivering a new shuttle to the lay when the previous shuttle has been spent, including means for supporting the new shuttle ready for delivery to the lay, movable as the shuttle is about to be delivered to raise the shuttle sufficiently to enter the lay on top of said supporting means.

30. In a loom, a shuttle discharging device at the front of the loom, a shuttle supplying device at the rear of said shuttle discharging device, a lay mounted to swing between said two devices, and operating mechanism for operating the discharging device to discharge a shuttle on one beat of the lay and the supplying device to supply a shuttle on the other beat of the lay.

31. In a loom, a lay, a shuttle to operate longitudinally thereof for weaving, positive operating mechanism for moving said shuttle at a substantially uniform speed across the loom, means for moving said shuttle transversely of said lay at one side thereof when the shuttle is to be discharged, and means to move a new shuttle from the opposite side transversely of said lay when being supplied.

32. In a loom, a lay, a shuttle adapted to travel on said lay, said shuttle being provided with a toothed rack, a toothed pinion carried by said lay, and automatic means for moving said shuttle sidewise transversely of the lay into operative position for engaging said rack with said pinion, the engaging portions of the teeth of said rack and of said pinions being beveled at their meeting ends for easy transverse entrance and self-alinement of the shuttle when moved sidewise onto the lay.

33. In a loom, a lay, a shuttle adapted to travel on said lay, said shuttle being provided with a toothed rack, a toothed pinion carried by said lay, automatic means for moving said shuttle sidewise transversely of the lay into operative position for engaging said rack with said pinion, the engaging portions of the teeth of said rack and of said pinions being beveled at their meeting ends for each transverse entrance and self-alinement of the shuttle when moved sidewise onto the lay, and a stationary endwise positioner for guiding the shuttle and its rack teeth into approximate alinement with its correct position and with the pinion teeth prior to the mutual engagement of the rack with the pinion.

In testimony whereof, I have signed my name to this specification, in the presence of two subscribing witnesses.

THOMAS P. WALSH.

Witnesses:
 GEO. H. MAXWELL,
 THOMAS F. LYDON.